United States Patent
Park et al.

(10) Patent No.: US 9,061,945 B2
(45) Date of Patent: Jun. 23, 2015

(54) METHOD OF MANUFACTURING PEROVSKITE POWDER, PEROVSKITE POWDER MANUFACTURED BY THE SAME AND MULTILAYER CERAMIC ELECTRONIC COMPONENT

(71) Applicant: SAMSUNG ELECTRO-MECHANICS CO., LTD., Suwon, Gyunggi-do (KR)

(72) Inventors: Kum Jin Park, Gyungg-do (KR); Sang Hyuk Kim, Gyunggi-do (KR); Hye Young Baeg, Gyunggi-do (KR); Hyung Joon Jeon, Gyunggi-do (KR); Sang Hoon Kwon, Gyunggi-do (KP); Chang Hak Choi, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 141 days.

(21) Appl. No.: 14/020,135

(22) Filed: Sep. 6, 2013

(65) Prior Publication Data

US 2014/0005029 A1  Jan. 2, 2014

Related U.S. Application Data

(62) Division of application No. 13/316,078, filed on Dec. 9, 2011, now abandoned.

(30) Foreign Application Priority Data

Dec. 10, 2010 (KR) .................. 10-2010-0126242

(51) Int. Cl.
*C04B 35/468* (2006.01)
*B82Y 30/00* (2011.01)
(Continued)

(52) U.S. Cl.
CPC ............ *C04B 35/4682* (2013.01); *B82Y 30/00* (2013.01); *C04B 35/49* (2013.01);
(Continued)

(58) Field of Classification Search
None
See application file for complete search history.

(56) References Cited

U.S. PATENT DOCUMENTS

| 4,832,939 A | 5/1989 | Menashi et al. |
| 5,231,127 A | 7/1993 | Kroenke et al. |

(Continued)

FOREIGN PATENT DOCUMENTS

| JP | 2010-030861 A | 2/2010 |
| JP | 2010-087434 A | 4/2010 |

(Continued)

OTHER PUBLICATIONS

Translation of KR 1020060028892A, Apr. 2006.*
(Continued)

*Primary Examiner* — Steven Bos
(74) *Attorney, Agent, or Firm* — McDermott Will & Emery LLP

(57) ABSTRACT

There are provided a method of manufacturing perovskite powder, and perovskite powder and a multilayer ceramic electronic component manufactured thereof. The manufacturing method includes: washing metal oxide hydrate to remove impurities therefrom; adding pure water and an acid or a base to the metal oxide hydrate to prepare a metal oxide sol; mixing the metal oxide sol with a metal salt to form perovskite particle nuclei; and conducting grain growth of the perovskite particle nuclei by hydrothermal treatment to produce perovskite powder. The method of manufacturing perovskite powder and the perovskite powder manufactured by the same have advantages such as excellent crystallinity, reduced generation of fine powder, and favorable dispersion properties.

17 Claims, 7 Drawing Sheets

(51) Int. Cl.
*C04B 35/49* (2006.01)
*H01C 7/00* (2006.01)
*H01C 17/065* (2006.01)
*H01G 4/12* (2006.01)
*H01G 4/30* (2006.01)
*C01G 23/00* (2006.01)
*C01G 23/053* (2006.01)
*C04B 35/624* (2006.01)

(52) U.S. Cl.
CPC .............. *C04B 2235/3224* (2013.01); *C04B 2235/3225* (2013.01); *C04B 2235/3244* (2013.01); *C04B 2235/5296* (2013.01); *C04B 2235/5445* (2013.01); *C04B 2235/5454* (2013.01); *C04B 2235/5463* (2013.01); *C04B 2235/765* (2013.01); *H01C 7/008* (2013.01); *H01C 17/06533* (2013.01); *H01G 4/1245* (2013.01); *H01G 4/30* (2013.01); *C01G 23/003* (2013.01); *C01G 23/006* (2013.01); *C01G 23/053* (2013.01); *C01G 23/0536* (2013.01); *C01P 2002/34* (2013.01); *C01P 2002/77* (2013.01); *C01P 2004/03* (2013.01); *C01P 2004/04* (2013.01); *C01P 2004/32* (2013.01); *C01P 2004/51* (2013.01); *C01P 2004/62* (2013.01); *C01P 2004/64* (2013.01); *C01P 2006/12* (2013.01); *C01P 2006/14* (2013.01); *C04B 35/624* (2013.01)

(56) References Cited

U.S. PATENT DOCUMENTS

| | | | |
|---|---|---|---|
| 6,409,983 | B1 | 6/2002 | Choi et al. |
| 6,641,794 | B2 | 11/2003 | Lee et al. |
| 6,824,873 | B2 | 11/2004 | Hattori et al. |
| 6,906,906 | B2 | 6/2005 | Hattori |
| 7,271,114 | B2 | 9/2007 | Kawamura et al. |
| 8,335,073 | B2 | 12/2012 | Komatsu et al. |
| 2005/0011857 | A1 | 1/2005 | Borland et al. |
| 2006/0078492 | A1* | 4/2006 | Kurozumi et al. ............ 423/598 |
| 2006/0114641 | A1 | 6/2006 | Iwasaki et al. |
| 2006/0221550 | A1 | 10/2006 | Ryu et al. |
| 2008/0145292 | A1* | 6/2008 | Shirakawa et al. ........... 423/263 |
| 2011/0033371 | A1 | 2/2011 | Lu et al. |
| 2011/0274614 | A1 | 11/2011 | Lamminmaki et al. |

FOREIGN PATENT DOCUMENTS

| | | |
|---|---|---|
| KR | 10-2001-0028286 | 4/2001 |
| KR | 10-2006-0028892 | 4/2006 |
| WO | 2010/052363 A1 | 5/2010 |

OTHER PUBLICATIONS

United States Office Action issued in U.S. Appl. No. 13/764,502 dated Oct. 30, 2013.

U.S. Office Action issued in U.S. Appl. No. 13/764,502 dated Mar. 3, 2014.

\* cited by examiner

A-A`

METHOD OF MANUFACTURING PEROVSKITE POWDER, PEROVSKITE POWDER MANUFACTURED BY THE SAME AND MULTILAYER CERAMIC ELECTRONIC COMPONENT

CROSS-REFERENCE TO RELATED APPLICATIONS

This application is a Divisional Application of U.S. application Ser. No. 13/316,078, filed Dec. 9, 2011, which claims the priority of Korean Patent Application No. 10-2010-0126242 filed on Dec. 10, 2010, in the Korean Intellectual Property Office, the disclosures of which are incorporated herein by reference.

BACKGROUND OF THE INVENTION

1. Field of the Invention

The present invention relates to a method of manufacturing perovskite powder in the form of microparticles with excellent crystallinity and favorable dispersion properties, by the preparation of a high concentration and high purity metal oxide sol, as well as perovskite powder and a multilayer ceramic electronic component manufactured by the same.

2. Description of the Related Art

Perovskite powder is a ferroelectric ceramic material and broadly used as a raw material of electronic components such as a multilayer chip capacitor (MLCC), a ceramic filter, a piezoelectric device, a ferroelectric memory, a thermistor, a varistor, and the like.

Since electronic component manufacturers have recently tended to produce electronic components with decreased size and weight, increased capacity and improved reliability, ferroelectric particles are required to have a relatively small size, high dielectric constant and excellent reliability.

Conventional methods of manufacturing perovskite powder include a solid phase method and a wet process, and such a wet process includes oxalate precipitation, hydrothermal synthesis, and the like.

The solid phase method typically has disadvantages such as producing powder containing relatively large particles having a minimum particle size of about 1 micrometer, difficulties in controlling particle size, agglomeration of particles, contamination during the firing of particles, and the like, therefore, the solid phase method entails problems in the production of perovskite powder with regard to microparticles thereof.

In a variety of conventional processes, the tetragonality of dielectric particles generally deteriorates when the particle size thereof decreases. If the particle size is reduced to less than 100 nm, it is very difficult to secure a desired crystal axial ratio (c/a).

Further, with a decrease in the size of powder particles, dispersion of the powder becomes more difficult. Therefore, fine powder requires a high degree of dispersibility.

Existing solid phase methods or co-precipitation methods form a crystalline phase by high temperature calcination, therefore, requiring a high temperature calcining process and/or a grinding (or pulverization) process.

Due to the foregoing, synthesized perovskite powder entails problems such as poor morphology, broad particle size distribution, difficulties in dispersibility caused by the agglomeration of particles due to heat treatment, the generation of microfine particles after pulverization, and the like.

In the case in which the perovskite powder is synthesized by a hydrothermal process without heat treatment, the dispersion problem may be overcome. Moreover, hydrothermal synthesis may easily control the morphology of powder and enable the production of perovskite powder with a small particle size and a narrow distribution of particle sizes.

However, such a hydrothermal powder synthesis process has disadvantages in that a crystal structure has an oxygen site substituted by hydroxyl (—OH) group, causing defects such as the formation of pores. Therefore, it is difficult to improve the crystallinity of synthesized particles.

SUMMARY OF THE INVENTION

An aspect of the present invention provides a method of manufacturing perovskite powder in the form of microparticles with excellent crystallinity and favorable dispersion, including preparation of a high concentration and density metal oxide sol, as well as perovskite powder and a multilayer ceramic electronic component manufactured by the same.

According to an aspect of the present invention, there is provided a method of manufacturing perovskite powder, the method including: washing metal oxide hydrate to remove impurities therefrom; adding pure water and an acid or a base to the metal oxide hydrate to prepare a metal oxide sol; and mixing the metal oxide sol with a metal salt to form perovskite particle cores (or nuclei); and conducting grain growth of the perovskite particle nuclei to produce perovskite powder.

The metal oxide sol may have a degree of transmittance of more than 50%.

The metal oxide sol may have a particle size of less than 10 nm.

The perovskite powder may be at least one selected from a group consisting of $BaTiO_3$, $BaTi_xZr_{1-x}O_3$, $Ba_xY_{1-x}TiO_3$, $Ba_xDy_{1-x}TiO_3$ and $Ba_xHo_{1-x}TiO_3$ (0<x<1).

The perovskite powder may have an average particle diameter ranging from 40 to 200 nm and a crystal axial ratio (c/a) ranging from 1.0045 to 1.0100.

The perovskite powder may have an average particle diameter ranging from 40 to 60 nm and a crystal axial ratio (c/a) ranging from 1.0045 to 1.0075.

The perovskite powder may have an average particle diameter ranging from 60 to 80 nm and a crystal axial ratio (c/a) ranging from 1.0062 to 1.009.

The perovskite powder may have an average particle diameter ranging from 80 to 200 nm and a crystal axial ratio (c/a) ranging from 1.0080 to 1.01.

The metal oxide hydrate may be at least one selected from a group consisting of titanium hydrate and zirconium hydrate.

The removal of the impurities may be performed by mixing metal oxide hydrate in a gel form with pure water and agitating a mixture to separate the impurities from a metal portion, and removing a filtrate.

The acid used in the present invention may be at least one selected from a group consisting of hydrochloric acid, nitric acid, sulfuric acid, phosphoric acid, formic acid, acetic acid and polycarboxylic acid.

The base used in the present invention may be at least one selected from a group consisting of tetramethylammonium hydroxide and tetraethylammonium hydroxide.

The acid or the base may be added in an amount of 0.0001 to 0.2 mole relative to a content of metal oxide hydrate.

The preparation of the metal oxide sol may be performed by maintaining the metal oxide hydrate at 0 to 60° C. for 0.1 to 72 hours while agitating the same using a high viscosity agitator.

The metal salt used in the present invention may be barium hydroxide or a mixture of barium hydroxide and a rare-earth salt.

The perovskite particle nuclei may be formed at 60 to 150° C.

The perovskite powder may be formed while increasing a temperature of the perovskite particle nuclei from 150° C. to 400° C.

According to another aspect of the present invention, there is provided perovskite powder produced by: washing metal oxide hydrate to remove impurities therefrom; adding pure water and an acid or a base to the metal oxide hydrate to prepare a metal oxide sol; mixing the metal oxide sol with a metal salt to form perovskite particle nuclei; conducting grain growth of the perovskite particle nuclei to produce perovskite powder as a final product.

According to a still further aspect of the present invention, there is provided a multilayer ceramic electronic component including: a ceramic sintered body having lamiated dielectric layers, each dielectric layer containing perovskite powder; internal electrode layers formed on the dielectric layers; and external electrodes provided outwardly of the ceramic sintered body and electrically connected to the internal electrodes, wherein the perovskite powder is produced by: adding pure water and an acid or abase to metal oxide hydrate to prepare a metal oxide sol; mixing the metal oxide sol with a metal salt to form perovskite particle nuclei; and conducting grain growth of the perovskite particle nuclei.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
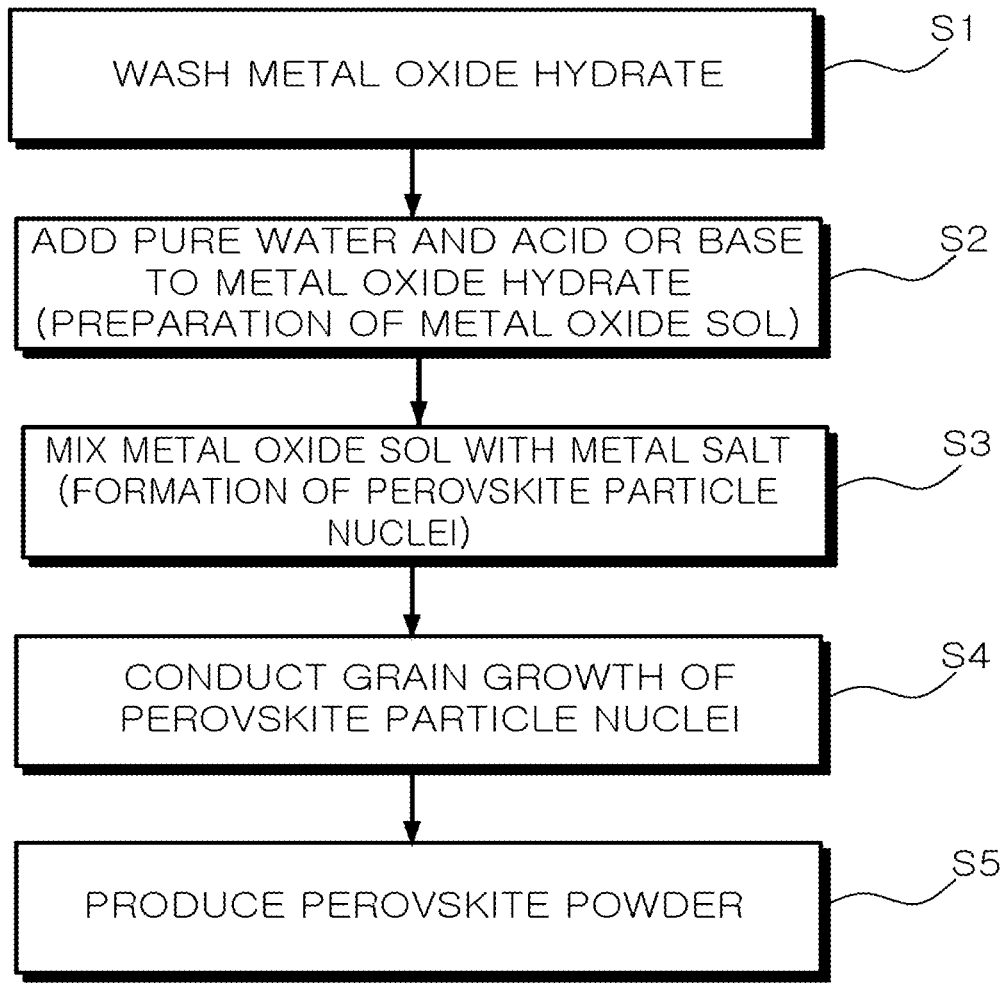
FIG. 1 is a flowchart illustrating a process of manufacturing perovskite powder according to an exemplary embodiment of the present invention.

Hereinafter, exemplary embodiments will be described in detail with reference to the accompanying drawings. However, other modifications, variations and/or alterations thereof may be possible and the present invention is not particularly limited to the following embodiments. These exemplary embodiments are provided to allow those skilled in the art to which the present invention pertains to more clearly understand the present invention. Therefore, shapes and/or sizes of respective elements shown in the accompanying drawings may be enlarged for clarity and like reference numerals denote elements substantially having the same configurations or performing similar functions and actions throughout the drawings.

In addition, unless explicitly described to the contrary, the word "comprise" and variations such as "comprises" or "comprising," will be understood to imply the inclusion of stated elements but not the exclusion of any other elements.

FIG. 1 is a flowchart illustrating a process of manufacturing perovskite powder according to an exemplary embodiment of the present invention.

Referring to FIG. 1, a method of manufacturing perovskite powder according to an exemplary embodiment of the present invention includes: washing metal oxide hydrate to remove impurities therefrom (S1); adding pure water and an acid or a base to the metal oxide hydrate to prepare a metal oxide sol (S2); mixing the metal oxide sol with a metal salt to form perovskite particle nuclei (S3); and conducting grain growth of the perovskite particle nuclei (S4) in order to produce perovskite powder as a final product (S5).

The following detailed description will be given to explain respective processes of the method of manufacturing perovskite powder according to the foregoing exemplary embodiment.

Perovskite powder is a powder having $ABO_3$ structure and, in the exemplary embodiment of the present invention, metal oxide hydrate is a source of elements corresponding to B site while a metal salt is a source of elements corresponding to A site.

First, the metal oxide hydrate is washed to remove impurities therefrom in operation S1.

The metal oxide hydrate may be at least one selected from a group consisting of titanium hydrate and zirconium hydrate.

Since titania and zirconia are very simply hydrolyzed, mixing these materials with pure water without alternative additives may precipitate titanium hydrate and zirconium hydrate, respectively, in a gel state.

In order to remove impurities from the metal oxide hydrate by washing the same, pure water is added to obtain a $H_2O$/metal molar ratio of more than 10 while agitating the mixture from 10 minutes to 10 hours, so as to separate the impurities from a metal portion. Then, after precipitating the gel, the remaining filtrate is discarded.

More particularly, the metal oxide hydrate may be filtered under pressure to remove the residual solution, and further filtered while adding pure water thereto in order to remove impurities present on a surface of particles.

Gas generated during agitation may be removed under vacuum or more efficiently removed by introducing air under vacuum.

The metal oxide hydrate may be filtered under pressure to remove the residual solution, and further filtered while adding pure water thereto to remove impurities present on a surface of particles.

Next, an acid or a base as well as pure water are added to the metal oxide hydrate in operation S2.

After filtering, the pure water is further added to the obtained metal oxide hydrate and the mixture is agitated using a high viscosity agitator while maintaining the same at a temperature of 0 to 60° C. for 0.1 to 72 hours, thereby preparing a metal oxide hydrate slurry.

The acid or the base is added to the prepared slurry and, in this case, the acid or the base is used as a peptizing agent and may be added in an amount of 0.0001 to 0.2 mole relative to content of the metal oxide hydrate.

The acid used in the exemplary embodiment of the present invention is not particularly limited but may include generally known acids, for example, hydrochloric acid, nitric acid, sulfuric acid, phosphoric acid, formic acid, acetic acid, polycarboxylic acid, etc., which may be used alone or in combination of two or more thereof.

The base used in the exemplary embodiment of the present invention is not particularly limited but may include generally known bases, for example, tetramethylammonium hydroxide, tetraethylammonium hydroxide, etc., which may be used alone or as a combination thereof.

According to the foregoing processes, a high concentration and purity metal oxide sol may be prepared and, in this case, the metal oxide sol may have a transmittance of more than 50% and a particle size of less than 10 nm.

Following this, the metal oxide sol is mixed with a metal salt to form perovskite particle nuclei in operation S3.

The metal salt used herein may be barium hydroxide or a mixture of barium hydroxide and a rare-earth salt.

Such rare-earth salt is not particularly limited but may include, for example, yttrium (Y), dysprosium (Dy), holmium (Ho), etc.

The formation of perovskite particle nuclei may be executed at 60 to 150° C.

In this regard, a specific feature of the present invention is to rapidly react the metal salt in dissolved state with the metal oxide sol having high concentration and high purity.

In such a reaction, a mixing ratio of the reactant (metal salt/metal oxide) may range from 1 to 4, preferably 1.2 to 2.

In order to accelerate formation of perovskite particle nuclei, it is preferable to increase a concentration and pH value of the mixture including the metal oxide sol and the metal salt.

Then, the formed perovskite particle nuclei are subjected to grain growth in operation S4, thereby producing perovskite powder as a final product in operation S5.

Production of the perovskite powder may be conducted while increasing a temperature of the perovskite particle nuclei from 150 to 400° C.

Grain growth of particles may be slowly conducted at a high temperature while decreasing the concentration and pH value of the foregoing mixture, in order to improve crystallinity.

Therefore, after the perovskite particle nuclei at reduced concentration and pH value are placed in an autoclave and closely sealed, a temperature of the autoclave is increased from 150 to 400° C. and the particle nuclei in the autoclave are maintained at this temperature for 0.1 to 240 hours so as to proceed grain growth of particles.

According to the foregoing processes, highly crystalline perovskite powder particles are obtained.

Such obtained perovskite powder particles may be at least one selected from a group consisting of $BaTiO_3$, $BaTi_xZr_{1-x}O_3$, $Ba_xY_{1-x}TiO_3$, $Ba_xDy_{1-x}TiO_3$ and $Ba_xHo_{1-x}TiO_3$ (0<x<1).

The highly crystalline perovskite powder prepared by the method of manufacturing perovskite powder, as described above, may have an average particle diameter ranging from 40 to 200 nm and a crystal axial ratio (c/a) ranging from 1.0045 to 1.0100.

In particular, for a highly crystalline barium titanate powder having a particle size of 40 to 60 nm, the crystal axial ratio (c/a) may range from 1.0045 to 1.0075. Likewise, if the particle size ranges from 60 to 80 nm, the crystal axial ratio may range from 1.0062 to 1.0090. Also, when the particle size ranges from 80 to 200 nm, the crystal axial ratio may range from 1.0080 to 1.01.

Three axial axes are defined as 'a', 'b' and 'c' and b-axis in a tetragonal particle has substantially the same length as of a-axis, thus being indicated as 'a-axis.' In this regard, the crystal axial ratio (c/a) means a ratio of lattice lengths of c-axis to a-axis.

Figure 2:
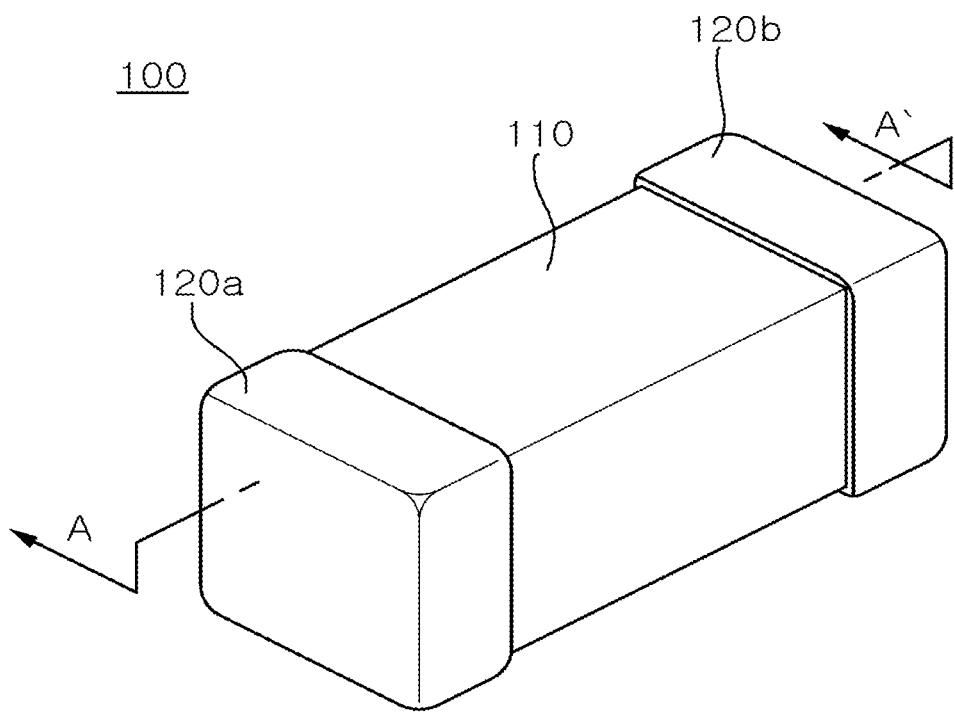
FIG. 2 is a perspective view illustrating a multilayer ceramic capacitor according to an exemplary embodiment of the present invention.
Figure 3:
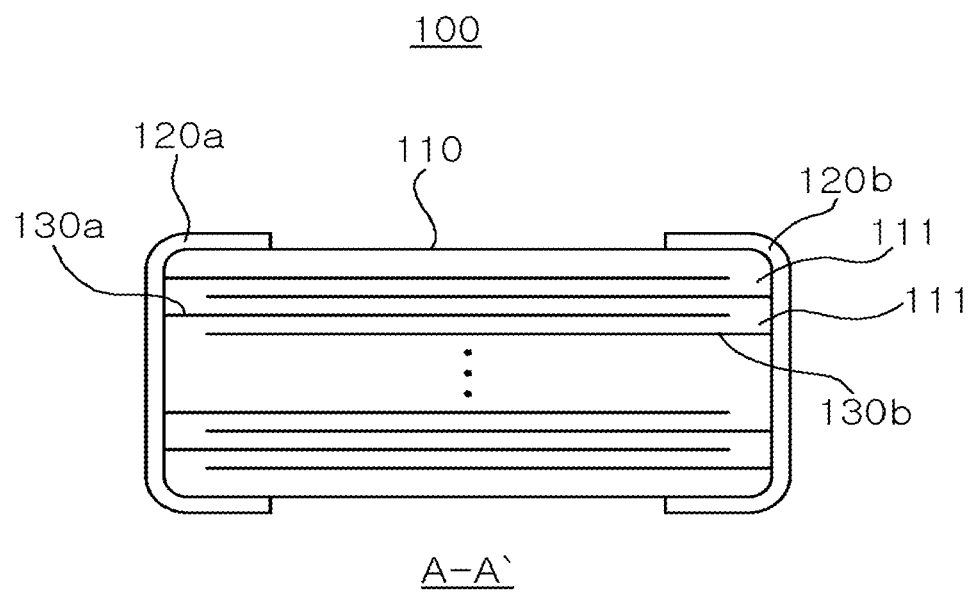
FIG. 3 is a cross-sectional view taken along line A-A' shown in FIG. 2.

FIG. 2 is a perspective view illustrating a multilayer ceramic capacitor according to an exemplary embodiment of the present invention while FIG. 3 is a cross-sectional view taken along lines A-A' shown in FIG. 2.

In the present exemplary embodiment, the following detailed description will be given to explain a multilayer ceramic capacitor selected as an illustrative example among various multilayer ceramic electronic components.

A multilayer ceramic capacitor 100 according to this exemplary embodiment includes: a ceramic sintered body 110 having a plurality of dielectric layers 111 laminated one after another; internal electrode layers 130a and 130b formed on the laminated dielectric layers 111; and external electrodes 120a and 120b provided on outer surfaces of the ceramic sintered body 110 and electrically connected to the internal electrodes.

The dielectric layers 111 of the multilayer ceramic capacitor 100 may include perovskite powder produced according to an exemplary embodiment of the present invention.

A method of manufacturing the foregoing perovskite powder and characteristics thereof have been described in detail above.

The multilayer ceramic capacitor 100 according to the present exemplary embodiment shows high dielectric constant and excellent reliability.

Hereinafter, preferred embodiments of the present invention will be described with reference to the following examples and comparative examples. However, the present invention is not particularly limited thereto.

Example 1

Preparation of Titania Nano Sol using Acidic Peptizing Agent and Titanium Alkoxide More than 5-fold volume of pure water was added to titanium isopropoxide and the mixture was hydrolyzed under agitation. After precipitating a titanium hydrate gel formed by hydrolysis, a supernatant was discarded and 10-fold weight of pure water was further added to the titanium hydrate gel. Then, the gel was washed under vacuum while agitating the same. In order to remove an organic material formed during washing, the foregoing procedures are repeated twice. A second supernatant was discarded again and a precipitate was passed through a filter paper. Then, pure water was added again to the obtained titanium hydrate in order to reach a molar concentration of 5M, followed by adding nitric acid to satisfy H+/Ti=0.5. The mixture was subjected to peptization for 3 hours by increasing a temperature of the mixture in an extent of about 50° C. while agitating the same using a high viscosity agitator, thereby preparing a metal oxide sol. The metal oxide sol formed by peptization was a translucent, slightly bluish and mono-dispersed sol with excellent stability. As a result of measuring a transmittance of the formed sol by Turbiscan, the transmittance of the sol was found to be about 75%. For reference, pure water has a transmittance of 90%. $TiO_2$ particles have a particle size of about 3 nm, are formed in anatase grade and mono-crystalline state.

Example 2

Preparation of Titania Nano Sol using Acidic Peptizing Agent and Titanium Salt

More than 5-fold volume of pure water was gently added to titanium oxide dichloride ($TiOCl_2$) under agitation, thus preparing a transparent solution. Ammonia water was slowly added to the solution to increase pH value, thus inducing gel reaction. Continuously adding ammonia water, the gel was dissolved to generate a precipitate containing titanium hydrate. While precipitating the formed titanium hydrate, a supernatant was discarded and 10-fold weight of pure water was added again to a titanium hydrate gel (that is, the precipitate). The mixture was washed under vacuum while agitating. These procedures are repeated six times. A peptizing process is conducted by the same procedures as described in Example 1. The prepared TiO$_2$ sol exhibited a transmittance of 70%.

Example 3

Preparation of Titania Nano Sol using Alkaline Peptizing Agent and Titanium Alkoxide More than 5-fold volume of pure water was gently added to titanium isopropoxide under agitation to conduct hydrolysis. After precipitating a titanium hydrate gel formed by hydrolysis, a supernatant was discarded and 10-fold weight of pure water was added again to the titanium hydrate gel. The mixture was washed under vacuum while agitating. In order to remove an organic material formed during washing, the foregoing procedures are repeated twice. A second supernatant was discarded again while a precipitate was passed through a filter paper. Then, pure water was added again to the obtained titanium hydrate in order to reach a molar concentration of 5M, followed by adding tetraethyl ammonium hydroxide to satisfy OH−/Ti=0.1. The mixture was subjected to peptization for 6 hours by increasing a temperature of the mixture in an extent of about 60° C. while agitating the same using a high viscosity agitator, thereby preparing a metal oxide sol. Such formed metal oxide sol was a translucent, slightly bluish and mono-dispersed sol with excellent stability. The TiO$_2$ sol showed a transmittance of 65%.

Comparative Example 1

Preparation of Titania Nano Sol using Acidic Peptizing Agent and Titanium Alkoxide The same procedures as described in Example 1 were used, except that an organic material such as IPA formed after hydrolysis performed by mixing titanium isopropoxide with pure water was not washed out, instead, being agitated for 48 hours then subjected to peptization under the same conditions as described in Example 1. As a result, although anatase TiO$_2$ sol was obtained, a transmittance thereof was not more than 5%.

Comparative Example 2

Preparation of Titania Nano Sol using Acidic Peptizing Agent and Titanium Alkoxide The same procedures described in Example 1 were used, except that an organic material such as IPA formed after hydrolysis performed by mixing titanium isopropoxide with pure water was not washed out, instead, being agitated for 48 hours. Then the mixture was subjected to peptization under the same conditions as described in Example 1, except that nitric acid was added to titanium hydrate to satisfy H+/Ti=0.2. As a result, although anatase TiO$_2$ sol was obtained, a transmittance thereof was not more than 30%.

The following Table 1 shows synthesis conditions described in Examples 1 to 3 and Comparative Examples 1 and 2, and assessment results thereof.

TABLE 1

| | | Synthesis conditions | | | Assessment results | |
|---|---|---|---|---|---|---|
| | Ti source | Washing during hydrolysis | Peptizing agent | Content of peptizing agent (H+ or OH−/Ti) | Transmittance (%) | Average particle size (nm) |
| Ex. 1 | Titanium isopropoxide | o | Nitric acid | 0.05 | 75 | 7 |
| Ex. 2 | Titanium oxide dichloride | o | Nitric acid | 0.05 | 70 | 6 |
| Ex. 3 | Titanium isopropoxide | o | Tetraethyl ammonium hydroxide | 0.1 | 65 | 8 |
| Com. Ex. 1 | Titanium isopropoxide | x | Nitric acid | 0.05 | 5 | 12 |
| Com. Ex. 2 | Titanium isopropoxide | x | Nitric acid | 0.2 | 30 | 7 |

Example 4

Synthesis of Barium Titanate

Barium hydroxide hydrate (Ba(OH)$_2$8H$_2$O) was entered into a reactor, followed by nitrogen purging and agitating at 100° C. to prepare a metal salt. This metal salt was added to the TiO$_2$ sol having a transmittance of 75% and satisfying H+/Ti=0.5, which was prepared according to the procedures in Example 1. The mixture was rapidly admixed while increasing the temperature of the sol to 100° C. The mixture was closely sealed and agitated at 100° C. to conduct reaction. After 30 minutes, the raw material was completely converted into barium titanate, in turn terminating a primary reaction. Next, pure water was added to the product in order to decrease a concentration of the product, that is, barium titanate, followed by grain growth of the barium titanate for 20 hours after increasing the temperature to 250° C. After filtering, the grown particles were washed using pure water and dried to yield powder with BET-specific surface area of 14.68 m$^2$/g, a particle diameter of 64 nm when measured using SEM, D99/D50 ratio (particle size of 99% particles/particle size of 50% particles) of 1.51 that indicates relatively uniform particle size distribution, a spherical morphology, and a crystal axial ratio (c/a) of 1.0069 that demonstrates excellent crystallinity in spite of a small particle size. The particles had internal pores of about 8 ppm in volume fraction.

Example 5

Synthesis of Barium Titanate

Substantially the same procedures as described in Example 4 were used, except that a concentration at grain growth of particles was increased and a processing time was extended to increase a size of the particles. The synthesized powder had BET-specific surface area of 13.00 $m^2/g$, a particle diameter of 75 nm when measured using SEM, D99/D50 ratio of 1.54 that indicates relatively uniform particle size distribution, a spherical morphology, and a crystal axial ratio (c/a) of 1.0082 that demonstrates excellent crystallinity in spite of a small particle size.

Example 6

Synthesis of Barium Titanate

Substantially the same procedures as described in Example 4 were used, except that a temperature of 330° C. was maintained for 30 hours during secondary reaction for securing grain growth of particles. The synthesized powder had BET-specific surface area of 14.36 $m^2/g$, a particle diameter of 62 nm when measured using SEM, D99/D50 ratio of 1.62, a spherical morphology, and a crystal axial ratio (c/a) of 1.0078 that demonstrates excellent crystallinity in spite of a small particle size.

Example 7

Synthesis of Barium Titanate

Barium hydroxide hydrate ($Ba(OH)_2 8H_2O$) was entered into a reactor, followed by nitrogen purging and agitating at 100° C. to prepare a metal salt. This metal salt was added to the $TiO_2$ sol having a transmittance of 65% and satisfying OH−/Ti=0.1, which was prepared according to the procedures in Example 3. The mixture was rapidly admixed while increasing the temperature of the sol to 100° C. The mixture was closely sealed and agitated at 100° C. to conduct reaction. After 30 minutes, the raw material was completely converted into barium titanate, in turn terminating a primary reaction. Next, pure water was added to the product in order to decrease a concentration of the product, that is, barium titanate, followed by grain growth thereof for 20 hours after increasing the temperature to 250° C. If using a basic $TiO_2$ sol, a grain-growth rate may increase because of higher pH. The produced powder had BET-specific surface area of 9.32 $m^2/g$, a particle diameter of 99 nm when measured using SEM, D99/D50 ratio of 1.65, a spherical morphology, and a crystal axial ratio (c/a) of 1.0094. The particles had internal pores of about 29 ppm in volume fraction, which were slightly increased owing to increase in grain-growth rate.

Comparative Example 3

Synthesis of Barium Titanate

Barium titanate was synthesized under substantially the same conditions as described in Example 4, except that $TiO_2$ sol having a transmittance of 5% prepared according to the procedures in Comparative Example 1 was used as a raw material. The dried powder had BET-specific surface area of 8.89 $m^2/g$, a particle diameter of 88 nm when measured using SEM, D99/D50 ratio of 2.2, a slightly angular morphology, and a crystal axial ratio (c/a) of 1.0075. When using $TiO_2$ sol with a large particle size and poor dispersion as a raw material, extremely non-uniform particles were obtained and, due to a high grain-growth rate thereof, the particles had a large amount of internal pores of 8320 ppm. As a result, the particles showed poor crystallinity, as compared with particle size.

Comparative Example 4

Synthesis of Barium Titanate

Barium titanate was synthesized under substantially the same conditions as described in Example 4, except that $TiO_2$ sol prepared by adding a peptizing agent in large amount during peptization (H+/Ti=0.2) while washing according to the procedures in Example 4 after hydrolysis was used as a raw material. Such $TiO_2$ sol had a favorable transmittance of 70%. The synthesized powder had BET-specific surface area of 14.9 $m^2/g$, a particle diameter of 65 nm when measured using SEM, D99/D50 ratio of 1.7, and a spherical and relatively uniform particle shape. However, a crystal axial ratio (c/a) of the powder was 1.0061, which is low, as compared with particle size. Although the particles had a small amount of internal pores of 35 ppm, crystallinity of the particles was not so excellent.

Comparative Example 5

Synthesis of Barium Titanate

Barium titanate was synthesized under substantially the same conditions as described in Example 4, except that mixing raw materials was started at 30° C. The synthesized powder had BET-specific surface area of 13.76 $m^2/g$, a particle diameter of 69 nm, D99/D50 ratio of 1.8, and a spherical and relatively uniform particle shape. However, the particles had a large amount of internal pores of 21074 ppm, and therefore, showed a relatively low crystal axial ratio (c/a) of 1.0056.

Comparative Example 6

Synthesis of Barium Titanate

Barium titanate was synthesized under substantially the same conditions as described in Example 4, except that reaction was carried out at 250° C. for 20 hours by increasing a temperature immediately after admixing raw materials, instead of performing primary and secondary syntheses separately. The synthesized powder had BET-specific surface area of 8.3 $m^2/g$, a particle diameter of 108 nm, D99/D50 ratio of 2.5 which indicates considerably non-uniform particle size distribution, and a crystal axial ratio of 1.0094. If two-step reaction is not used, uniformity of particles becomes significantly worse although crystallinity is not considerably deteriorated.

Comparative Example 7

Synthesis of Barium Titanate using Hydrothermal Process and Calcinations

Primary synthesis was conducted under substantially the same conditions as described in Example 4. After completing the primary synthesis, barium titanate powder was produced by decreasing a temperature, filtering a solution and washing the same. Here, the formed barium titanate powder had a spherical morphology and a particle size of about 10 nm with uniform particle size distribution, and each particle had a cubic shape. Such particles were heated at 900° C. for 3 hours to conduct grain growth. The synthesized powder had BET-specific surface area of 5.8 m$^2$/g, a particle diameter of 96 nm when measured using SEM, D99/D50 ratio of 2.23 and non-uniform morphology, and showed numerous interparticle necks. A crystal axial ratio (c/a) of the particles was 1.0069, which is considerably low, as compared with particle size.

The following Table 2 shows synthesis conditions described in Examples 4 to 7 and Comparative Example 3 to 7, and assessment results thereof.

FIGS. 4 to 10 are electron micrographs showing examples according to exemplary embodiments of the present invention and comparative examples.

Figure 11A:
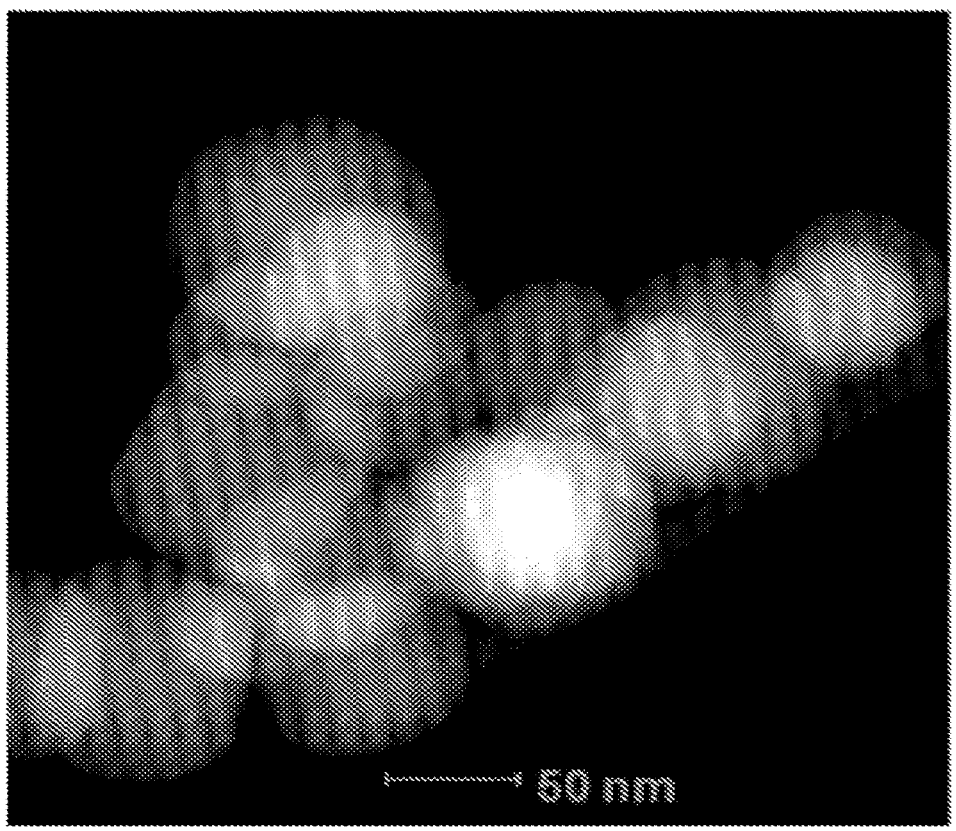
FIGS. 11A and 11B are TEM images showing examples according to exemplary embodiments of the present invention and comparative examples.
Figure 11B:
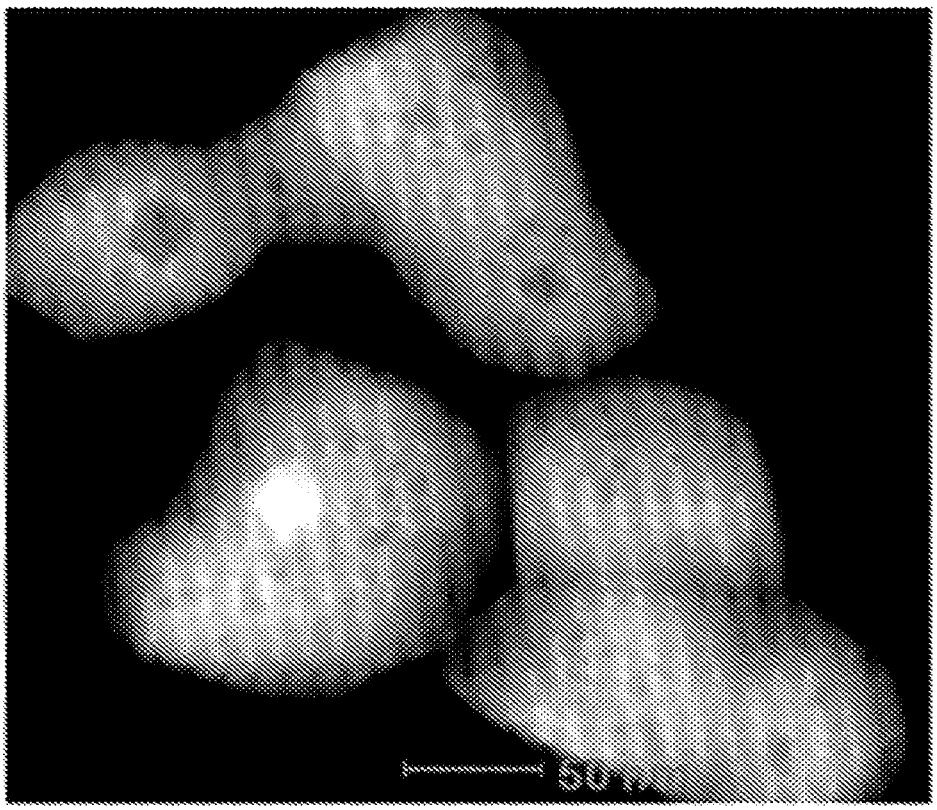

FIGS. 11A and 11B are transmission electron microscope (TEM) photographs showing examples according to exemplary embodiments of the present invention and comparative examples.

Figure 4:
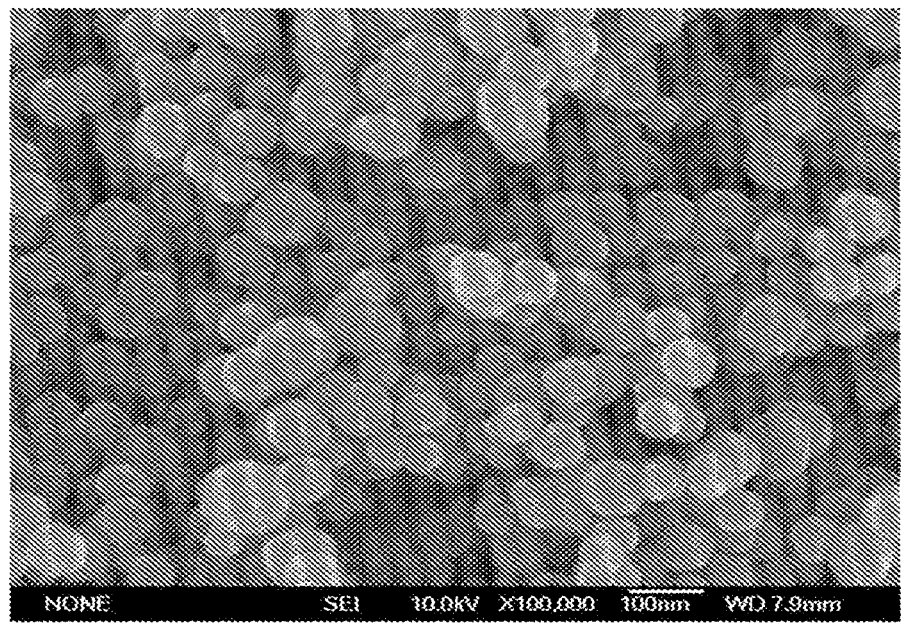
FIGS. 4 through 10 are electron micrographs showing examples according to exemplary embodiments of the present invention and comparative examples.
Figure 5:
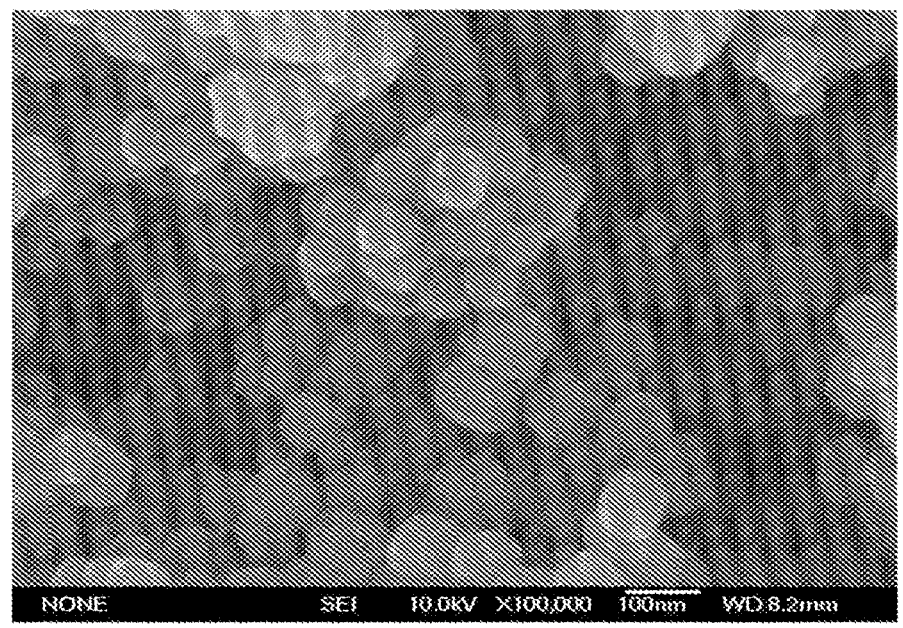
Figure 6:
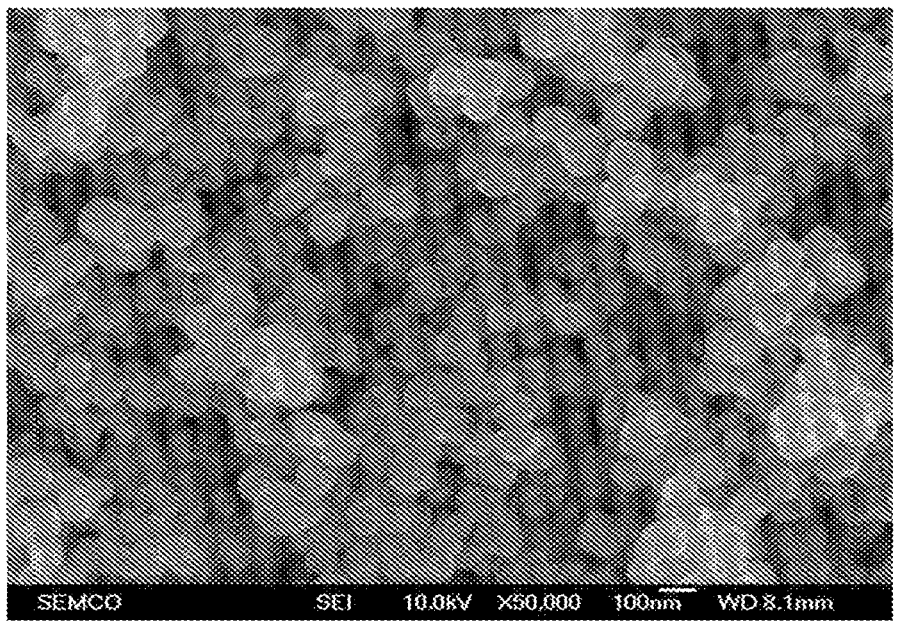
Figure 7:
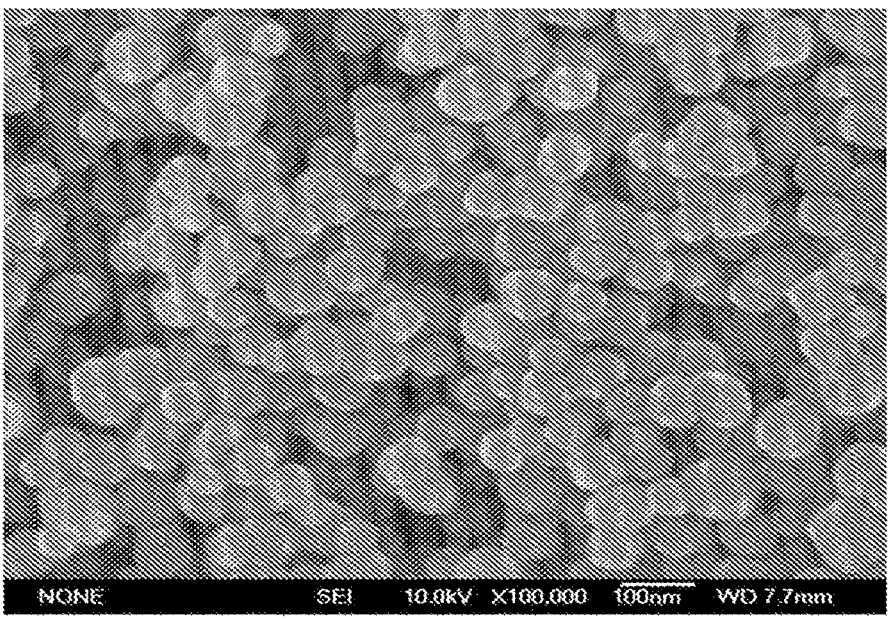

More particularly, FIG. 4 is an electron micrograph showing barium titanate particles obtained in Example 4. Likewise, FIGS. 5, 6 and 7 are electron micrographs showing barium titanate particles obtained in Examples 5, 7 and 8, respectively.

TABLE 2

| | Reaction conditions | | | | | | | Assessment results | | | | |
|---|---|---|---|---|---|---|---|---|---|---|---|---|
| | TiO$_2$ sol | | | Step 1 | | | Step 2 | | | | XRD | TEM |
| | trans-mittance | Molar ratio of peptizing agent | process | Feed temp-erature | Temp. of Step 1 | Time of Step 1 (min) | Temp. of Step 2 | time | BET Specific surface area | SEM D50 (nm) | SEM D99/D50 | Lattice constant ratio (c/a) | Pore Volume (ppm) |
| Ex. 4 | 75% | 0.05 | Two steps | 100° C. | 100° C. | 30 | 250 | 20 | 14.68 | 63.6 | 1.51 | 1.0069 | 8 |
| Ex. 5 | 75% | 0.05 | Two steps | 100° C. | 100° C. | 30 | 250 | 35 | 13.00 | 74.77 | 1.54 | 1.0082 | 12 |
| Ex. 6 | 75% | 0.05 | Two steps | 100° C. | 100° C. | 30 | 330 | 30 | 14.36 | 61.5 | 1.62 | 1.0078 | 2 |
| Ex. 7 | 65% | 0.1 | Two steps | 100° C. | 100° C. | 30 | 250 | 20 | 9.32 | 99.4 | 1.65 | 1.0094 | 29 |
| Com. Ex. 3 | 5% | 0.05 | Two steps | 100° C. | 100° C. | 30 | 250 | 20 | 8.89 | 87.7 | 2.21 | 1.0075 | 8320 |
| Com. Ex. 4 | 70% | 0.2 | Two steps | 100° C. | 100° C. | 30 | 250 | 20 | 14.9 | 65 | 1.7 | 1.0061 | 35 |
| Com. Ex. 5 | 75% | 0.05 | Two steps | 30° C. | 100° C. | 30 | 250 | 20 | 13.76 | 68.7 | 1.80 | 1.0056 | 21074 |
| Com. Ex. 6 | 75% | 0.05 | One step | 100° C. | — | — | 250 | 20 | 8.268 | 107.9 | 2.48 | 1.0094 | 4700 |
| Com. Ex. 7 | 75% | 0.05 | Calcination after one step | 100° C. | 100° C. | 30 | 900 | 3 | 5.8 | 95.6 | 2.23 | 1.0069 | 20804 |

Example 8

Synthesis of Ba$_{0.98}$Y$_{0.02}$TiO$_3$ using Hydrothermal Process

Barium hydroxide octahydrate (Ba(OH)$_2$8H$_2$O) and yttrium acetate hydrate were entered at a molar ratio of 98:2 into a reactor, followed by nitrogen purging and agitating at 80° C. to prepare a metal salt. This metal salt was added to the TiO$_2$ sol prepared according to the foregoing procedures. The mixture was closely sealed and agitated at 130° C. to conduct reaction. After 10 minutes, the raw materials were completely converted into barium titanate, in turn terminating nucleus formation. After decreasing the temperature and replacing the formed gas with nitrogen, pure water was added to decrease a concentration of barium titanate. Here, this solution was maintained at a pH value of 12.3. After increasing the temperature to 250° C., the barium titanate was subjected to grain growth for 20 hours. After filtering, washing with pure water and drying, the obtained powder had BET-specific surface area of 10.6 m$^2$/g, a particle diameter of 85 nm when measured using SEM.

Figure 8:
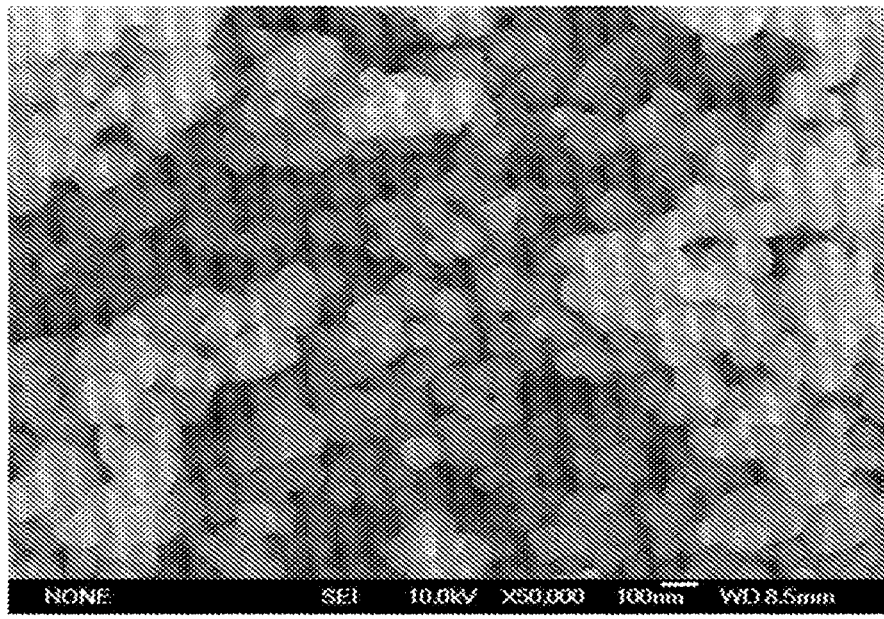
Figure 9:
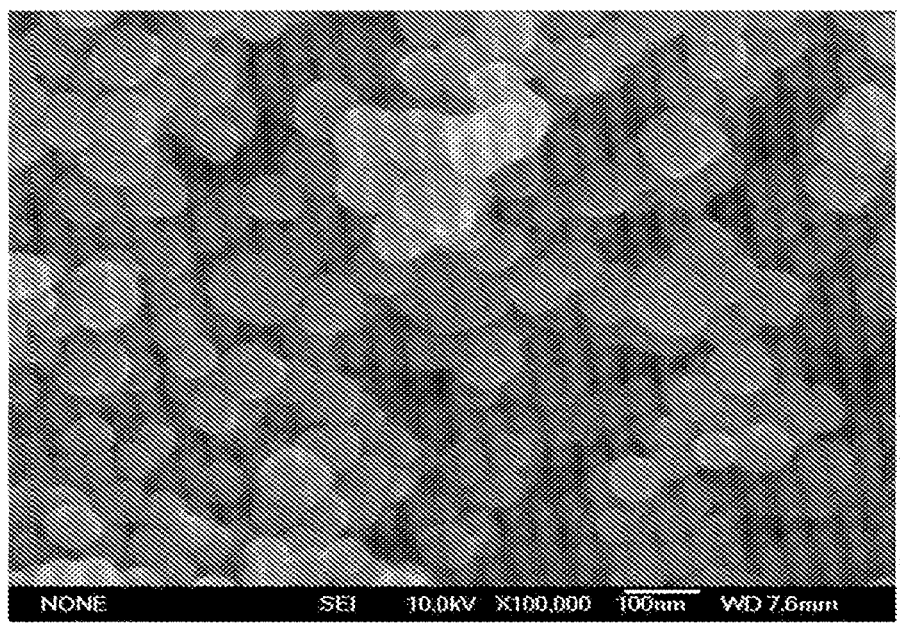
Figure 10:
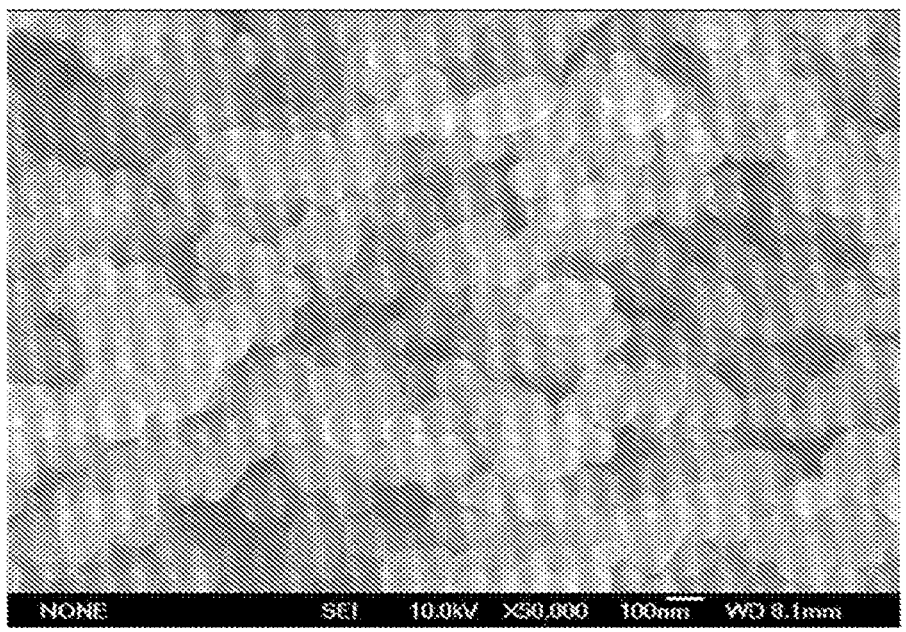

Similarly, FIGS. 8, 9 and 10 are electron micrographs showing barium titanate particles obtained Comparative Examples 3, 5 and 6, respectively.

FIG. 11A is a TEM photograph showing barium titanate particles obtained in Example 7 while FIG. 11B is a TEM photograph showing barium titanate particles obtained in Comparative Example 7.

Referring to FIGS. 4 to 10, 11A and 11B, it can be seen that perovskite powder prepared according to an exemplary embodiment of the present invention includes particles with a small amount of pores and has excellent crystallinity. In addition, since the present invention requires no alternative calcination and/or pulverization processes, the synthesized powder does not contain a lot of fine powder, and dispersion thereof is very easily conducted.

Moreover, the production process according to an exemplary embodiment of the present invention has advantages such as reduced raw material costs, which in turn reduce overall production costs.

A multilayer ceramic electronic component fabricated according to an exemplary embodiment may have beneficial features such as the preparation of pervoskite powder without large particles, simple dispersibility properties sufficient to easily embody a reduction of layer thickness, a high dielectric constant and excellent reliability, and so forth.

As set forth above, according to exemplary embodiments of the present invention, a high concentration and purity metal oxide sol is prepared through peptization and used to synthesize perovskite powder, thereby manufacturing high crystallinity perovskite powder without calcination and pulverization. The present invention also has advantages such as decreased generation of fine powder, good dispersion, and the like.

Furthermore, the pervoskite powder shows excellent effects such as decreased generation of pores.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing perovskite powder, the method comprising:
    washing metal oxide hydrate to remove impurities therefrom;
    adding pure water and an acid or a base to the metal oxide hydrate to prepare a metal oxide sol;
    mixing the metal oxide sol with a metal salt to form perovskite particle nuclei; and
    conducting grain growth of the perovskite particle nuclei by hydrothermal treatment to produce perovskite powder.

2. The method of manufacturing pervoskite powder of claim 1, wherein the metal oxide sol has a degree of transmittance of more than 50%.

3. The method of manufacturing perovskite powder of claim 1, wherein the metal oxide sol has a particle size of less than 10 nm.

4. The method of manufacturing perovskite powder of claim 1, wherein the perovskite powder is at least one selected from the group consisting of $BaTiO_3$, $BaTi_xZr_{1-x}O_3$, $Ba_xY_{1-x}TiO_3$, $Ba_xDy_{1-x}TiO_3$ and $Ba_xHo_{1-x}TiO_3$ (0<x<1).

5. The method of manufacturing perovskite powder of claim 1, wherein the perovskite powder has an average particle diameter ranging from 40 to 200 nm and a crystal axial ratio (c/a) ranging from 1.0045 to 1.0100.

6. The method of manufacturing perovskite powder of claim 1, wherein the perovskite powder has an average particle diameter ranging from 40 to 60 nm and a crystal axial ratio (c/a) ranging from 1.0045 to 1.0075.

7. The method of manufacturing perovskite powder of claim 1, wherein the perovskite powder has an average particle diameter ranging from 60 to 80 nm and a crystal axial ratio (c/a) ranging from 1.0062 to 1.009.

8. The method of manufacturing perovskite powder of claim 1, wherein the perovskite powder has an average particle diameter ranging from 80 to 200 nm and a crystal axial ratio (c/a) ranging from 1.0080 to 1.01.

9. The method of manufacturing perovskite powder of claim 1, wherein the metal oxide hydrate is at least one selected from the group consisting of titanium hydrate and zirconium hydrate.

10. The method of manufacturing perovskite powder of claim 1, wherein the removal of the impurities is performed by mixing the metal oxide hydrate with pure water, agitating a mixture to separate the impurities from a metal portion and removing a filtrate.

11. The method of manufacturing perovskite powder of claim 1, wherein the acid is at least one selected from the group consisting of hydrochloric acid, nitric acid, sulfuric acid, phosphoric acid, formic acid, acetic acid and polycarboxylic acid.

12. The method of manufacturing perovskite powder of claim 1, wherein the base is at least one selected from the group consisting of tetramethylammonium hydroxide and tetraethylammonium hydroxide.

13. The method of manufacturing perovskite powder of claim 1, wherein the acid or the base is added in an amount of 0.0001 to 0.2 mole, relative to a content of metal oxide hydrate.

14. The method of manufacturing perovskite powder of claim 1, wherein the preparation of the metal oxide sol is performed by maintaining the metal oxide hydrate at a temperature of 0 to 60° C. for 0.1 to 72 hours while agitating the same using an agitator.

15. The method of manufacturing perovskite powder of claim 1, wherein the metal salt is barium hydroxide or a mixture of barium hydroxide and a rare-earth salt.

16. The method of manufacturing perovskite powder of claim 1, wherein the formation of the perovskite particle nuclei is performed at a temperature of 60 to 150° C.

17. The method of manufacturing perovskite powder of claim 1, wherein the production of the perovskite powder is performed while increasing the temperature of perovskite particle nuclei from 150 to 400° C.

* * * * *